United States Patent

Motoi

[11] Patent Number: 5,539,719
[45] Date of Patent: Jul. 23, 1996

[54] LIGHT BEAM DEVIATION DETECTING DEVICE USED IN AN IMAGE FORMING APPARATUS

[75] Inventor: Toshihiro Motoi, Hachioji, Japan

[73] Assignee: Konica Corporation, Tokyo, Japan

[21] Appl. No.: 387,113

[22] Filed: Feb. 10, 1995

[30] Foreign Application Priority Data

Feb. 17, 1994 [JP] Japan .................................. 6-019710

[51] Int. Cl.⁶ .............................. G11B 7/00; G02B 26/08
[52] U.S. Cl. ................... 369/112; 250/208.1; 250/208.3; 250/578.1; 359/204; 359/216
[58] Field of Search ..................................... 369/112, 120, 369/121, 124, 44.41, 44.42; 250/208.1, 208.2, 208.3, 208.6, 238, 578.1; 359/204, 216, 217, 218, 219

[56] References Cited

U.S. PATENT DOCUMENTS

| | | | |
|---|---|---|---|
| 4,423,426 | 12/1983 | Kitamura . | |
| 4,724,330 | 2/1988 | Tuhro | 250/208.3 |
| 4,816,665 | 3/1989 | Hsu | 250/208.6 |
| 4,864,326 | 9/1989 | Kawamura et al. . | |
| 4,933,549 | 6/1990 | Fujioka et al. . | |
| 4,943,839 | 7/1990 | Kumano et al. | 250/578.1 |
| 5,105,296 | 4/1992 | Cho et al. . | |
| 5,177,632 | 1/1993 | Schwartz et al. | 359/216 |
| 5,181,193 | 1/1993 | Kume et al. | 369/112 |
| 5,291,018 | 3/1994 | Charpentier | 250/208.1 |
| 5,448,395 | 9/1995 | Lopez et al. | 250/208.1 |

FOREIGN PATENT DOCUMENTS

| | | |
|---|---|---|
| 0506410A2 | 9/1992 | European Pat. Off. . |
| 0632302A1 | 1/1995 | European Pat. Off. . |
| 63-50809 | 3/1988 | Japan . |
| 2-188713 | 7/1990 | Japan . |

OTHER PUBLICATIONS

*English language Abstract only.
PATENT ABSTRACTS OF JAPAN, vol. 14, No. 298 (P–1068) Jun. 27, 1990 & JP–A–02 093 619 (MITA), Apr. 4, 1990.
PATENT ABSTRACTS OF JAPAN, vol. 14, No. 472 (P–1116) Oct. 15, 1990 & JP–A–02 188 713 (CANON), Jul. 24, 1990.

*Primary Examiner*—Loha Ben
*Attorney, Agent, or Firm*—Frishauf, Holtz, Goodman, Langer & Chick

[57] ABSTRACT

A light beam deviation detecting device for detecting deviation of parallel light beams which simultaneously scan a photoreceptor in a primary scanning direction of the parallel light beams. The device includes: at least two sensors, each having a plane surface, for detecting the parallel light beams; in which initial contact edges of the plane detective surfaces on the sensors are not parallel to each other when the parallel light beams scan the plane surfaces in their primary scanning direction; a calculator circuit for counting time periods of the parallel light beams scanning from the initial contact edge of one of the plane surfaces to the initial contact edge of the other, and for calculating difference among the time periods; and a deviation calculator circuit for calculating deviation of the difference among the time periods from a reference time difference so that deviation of scanning positions of the parallel light beams in relation to each other in a sub-scanning direction, which is perpendicular to the primary scanning direction, is determined; in which an angle $\theta$ between the initial contact edge of one of the plane surfaces and the initial contact edge of the other satisfies: $53.13° \leq \theta \leq 126.86°$.

12 Claims, 16 Drawing Sheets

LIGHT BEAM DEVIATION DETECTING DEVICE USED IN AN IMAGE FORMING APPARATUS

BACKGROUND OF THE INVENTION

The present invention relates to a light beam deviation detecting device used in an image forming apparatus, and more particularly to a technology for detecting deviation of a scanning position for each of a plurality of light beams in the sub-scanning direction in an image forming apparatus wherein a plurality of light beams are caused to scan a recording medium parallel in the primary scanning direction simultaneously so that plural lines may be recorded simultaneously.

In an image forming apparatus wherein a laser beam (light beam) modulated based on image signals is caused to scan on a recording medium for recording of image information after being deflected by a polygon mirror or the like, it is known that a plurality of laser beams are used for recording plural lines simultaneously for accelerating image recording (See Japanese Patent Publication Open to Public Inspection No. 188713/1990 (hereinafter referred to as Japanese Patent O.P.I Publication) and others).

However, when a plurality of laser beams are caused to scan simultaneously as stated above, it has sometimes happened that a scanning position of each laser beam deviated and a line interval for image recording thereby varied, resulting in detracted fidelity of image forming.

It is therefore desired that there is provided a device capable of detecting easily an amount of deviation of an interval of each laser beam in the sub-scanning direction from an expected value, and thereby a laser beam interval can be adjusted automatically, and thus the laser beam interval can be maintained at the expected value despite a change in environmental conditions and aging deterioration.

Further, when an actual scanning position is deviated from the reference scanning position in the sub-scanning direction, fidelity of image forming is deteriorated even when beam intervals can be adjusted to the expected value based on the results of the aforementioned detection of beam intervals deviations. Therefore, a device capable of detecting scanning positions in the sub-scanning direction easily has been desired.

In the aforementioned detection of an amount of deviation of a beam interval in the sub-scanning direction, there have been problems of a requirement that an amount of deviation needs to be detected within an expected resolving power and thereby necessary image recording accuracy needs to be maintained through adjustment of a laser beam scanning position. Further, there has been a problem that the necessary and lowest resolving power needs to be secured because of a problem that establishment of excessive accuracy for detecting an amount of deviation causes a cost increase of a sensor.

SUMMARY OF THE INVENTION

The present invention has been attained in view of the actual circumstances mentioned above, and its object is to provide a device capable of detecting simply and easily an amount of deviation of light beam intervals and amount of deviation of scanning position both in the sub-scanning direction.

Another object of the invention is to secure the necessary and lowest resolving power necessary for accuracy of image forming required in the aforementioned detection of an amount of deviation of light beam intervals.

Therefore, a light beam deviation detecting device related to the invention is structured, in an image forming apparatus in which plural light beams are caused to scan in parallel in the primary scanning direction simultaneously on a recording medium for recording plural lines simultaneously, to include a means for calculating a deviation amount in the sub-scanning direction wherein a light beam detection area that covers in the sub-scanning direction perpendicular to the aforesaid primary scanning direction the scanning lines of the aforesaid plural light beams is provided, at least two light beam detecting means wherein an edge at the starting side of primary scanning in each light beam detecting area is not in parallel each other is arranged to be positioned in the primary scanning direction, time interval detected by each of the aforesaid light beam detecting means for each light beam is measured, and an amount of deviation of intervals in the sub-scanning direction among the aforesaid plural light beams is calculated based on the results of measurement of detected intervals, and to include a means for detecting deviation from reference light beam that detects existence of occurrence of deviation of scanning position against the reference scanning position in the sub-scanning direction of the reference light beam specified among the aforesaid plural light beams.

In the device relating to the invention, the aforesaid means for detecting deviation from the reference light beam is structured to include a reference light beam detecting means that detects existence of passage of the aforesaid reference light beam at the aforesaid reference scanning position.

In the device relating to the invention, the aforesaid means for detecting deviation from the reference light beam is structured so that it detects occurrence of scanning position deviation against the aforesaid reference scanning position of the aforesaid reference light beam when a time interval detected by each of the aforesaid light beam detecting means for the aforesaid reference beam is out of a predetermined range.

The device relating to the invention is structured to include a means for adjusting deviation in the sub-scanning direction that adjusts the scanning position of other light beam in the sub-scanning direction with a scanning position of the aforesaid reference light beam in the sub-scanning direction that is fixed, based on the deviation amount calculated by the aforesaid means for calculating and detecting deviation in the sub-scanning direction.

The device relating to the invention is structured to include a means for warning reference light beam deviation that tells scanning position deviation of the reference light beam when the aforesaid reference light beam deviation detecting means detects occurrence of scanning position deviation of the aforesaid reference light beam against the aforesaid reference scanning position.

On the other hand, a light beam deviation detecting device related to the invention is structured, in an image forming apparatus in which plural light beams are caused to scan in parallel in the primary scanning direction simultaneously on a recording medium for recording plural lines simultaneously, to include a means for calculating a deviation amount in the sub-scanning direction wherein a light beam detection area that covers in the sub-scanning direction perpendicular to the aforesaid primary scanning direction the scanning lines of the aforesaid plural light beams is provided, at least two light beam detecting means wherein an edge at the starting side of primary scanning in each light beam detecting area is not in parallel with each other is arranged to be positioned in the primary scanning direction, time interval detected by each of the aforesaid light beam detecting means for each light beam is measured, and an amount of deviation of intervals in the sub-scanning direction among the aforesaid plural light beams is calculated based on the results of measurement of detected intervals, and the aforesaid light beam detecting means is arranged so that the following relation in terms of an included angle θmay be satisfied, $$\theta \geq 2 \cdot \tan^{-1} \{K/(2 \cdot CB)\}$$

when the included angle formed by ends which are not in parallel each other at the starting side in the primary scanning direction in the light beam detecting area is assumed to be θ, resolving power of a pixel clock is CB, and required resolving power in a pixel width is K.

In this case, in the light beam deviation detecting device related to the invention, the aforesaid required resolving power K was set to be 1 through 4 times the resolving power CB of the pixel clock mentioned above.

The device related to the invention was structured so that each of the light beam detecting means may have a light-receiving plane which is equivalent to an image forming plane of the aforesaid recording medium.

In addition, the device related to the invention was structured so that the aforesaid light beam detecting means may be structured integrally.

In the case of the device related to the invention, there is provided a light beam detecting area that covers scanning lines for a plurality of light beams in the sub-scanning direction, and at least two light beam detecting means wherein an end at the starting side of primary scanning in each light beam detecting area is not in parallel with others are arranged side by side in the primary scanning direction.

In this case, since an end at the starting side in the scanning direction in each light beam detecting means is not in parallel with others, a time interval (an interval for the rise of detection signals) wherein the same light beam is detected by each light beam detecting means is varied depending on the scanning position of the light beam in the sub-scanning direction. Therefore, a deviation of the aforesaid detected time interval obtained for each light beam is correlated with an interval of each light beam in the sub-scanning direction, which makes it possible to calculate an amount of deviation of an actual light beam interval against the expected interval.

The deviation of a light beam interval detected in the above manner, however, shows the relative positional relation of light beams, and even when light beams are deviated in parallel toward the sub-scanning direction while keeping mutual intervals, this can not be detected. Further, even when scanning positions in the sub-scanning direction are adjusted based on the aforesaid deviation amount of intervals, this does not lead to the condition wherein each light beam scans at its original scanning position.

With the background mentioned above, it has been made possible to detect the mutual intervals of plural light beams and to detect whether the light beam is scanning at its original scanning position in the sub-scanning direction or not, by judging whether the reference light beam specified from plural light beams is scanning on the reference position or not.

In the device related to the invention, whether the aforesaid reference light beam is scanning the reference scanning position in the sub-scanning direction or not can be judged by a reference light beam detecting means that detects whether the reference light beam passes the reference scanning position or not. Namely, the light beam detecting means is provided at the reference scanning position in advance, and then the reference light beam is caused to scan actually, thereby, the scanning position deviation of the reference light beam in the sub-scanning direction can be detected by judging whether the reference light beam is detected by the light beam detecting means or not.

Further, in the device related to the invention, whether the reference light beam is scanning on the reference scanning position in the sub-scanning direction or not can be judged based on the time interval wherein the reference light beam is detected by each light beam detecting means. Namely, the sub-scanning position can be judged by the time interval because the time interval wherein the reference light beam is detected by each light beam detecting means varies depending upon the scanning position in the sub-scanning direction. For the reason mentioned above, the scanning position deviation of the reference light beam can be detected through judgment of whether the aforesaid time interval obtained through measurement with the reference light beam being caused to scan shows the time corresponding to the original scanning position or not.

In the device related to the invention, a light beam interval can be corrected to the target value by fixing the scanning position of the reference light beam and by adjusting the scanning positions of other light beams in the sub-scanning direction based on the aforesaid amount of deviation calculated.

Further, in the device related to the invention, when the scanning position deviation of the reference light beam is detected, this is warned, and thereby it can be avoided that recording is made under the condition that all light beams are deviated in the sub-scanning direction.

On the other hand, in the light beam deviation detecting device used in an image forming apparatus related to the invention, a deviation amount can be calculated at the level of an appropriate resolving power by specifying included angle θformed by ends which are not in parallel with each other at the starting side in the primary scanning direction in the light beam detecting area as follows, in the constitution wherein a light beam detection area that covers in the sub-scanning direction the scanning lines of plural light beams is provided, at least two light beam detecting means wherein an end at the starting side of primary scanning in each light beam detecting area is not in parallel with each other is arranged, and a deviation amount of an interval between light beams can be calculated by the deviation of time interval wherein each light beam is detected by these detecting means.

$$53.13° \leq \theta \leq 126.86°$$

By specifying the included angle θas follows, a detecting unit for deviation amount of a light beam satisfying the required resolving power can be prepared;

$$\theta \geq 2 \cdot \tan^{-1}\{K/(2 \cdot CB)\}$$

wherein, resolving power of a pixel clock is CB, and K represents required resolving power in a pixel width.

In the device related to the invention, the aforesaid required resolving power K is set to be 1 through 4 times the resolving power CB of the pixel clock mentioned above, and thereby appropriate resolving power K for the resolving power of pixel clock is established.

In the device related to the invention, each of the aforesaid light beam detecting means has a light-receiving plane equivalent to the image-forming plane on the recording medium mentioned above so that an amount of deviation of the scanning position on the recording plane can be detected accurately.

In the device related to the invention, light beam detecting means are structured integrally so that an occurrence of an error of the aforesaid included angle θ can be avoided.

DETAILED DESCRIPTION OF THE INVENTION

Examples of the invention will be explained as follows.

Figure 1:
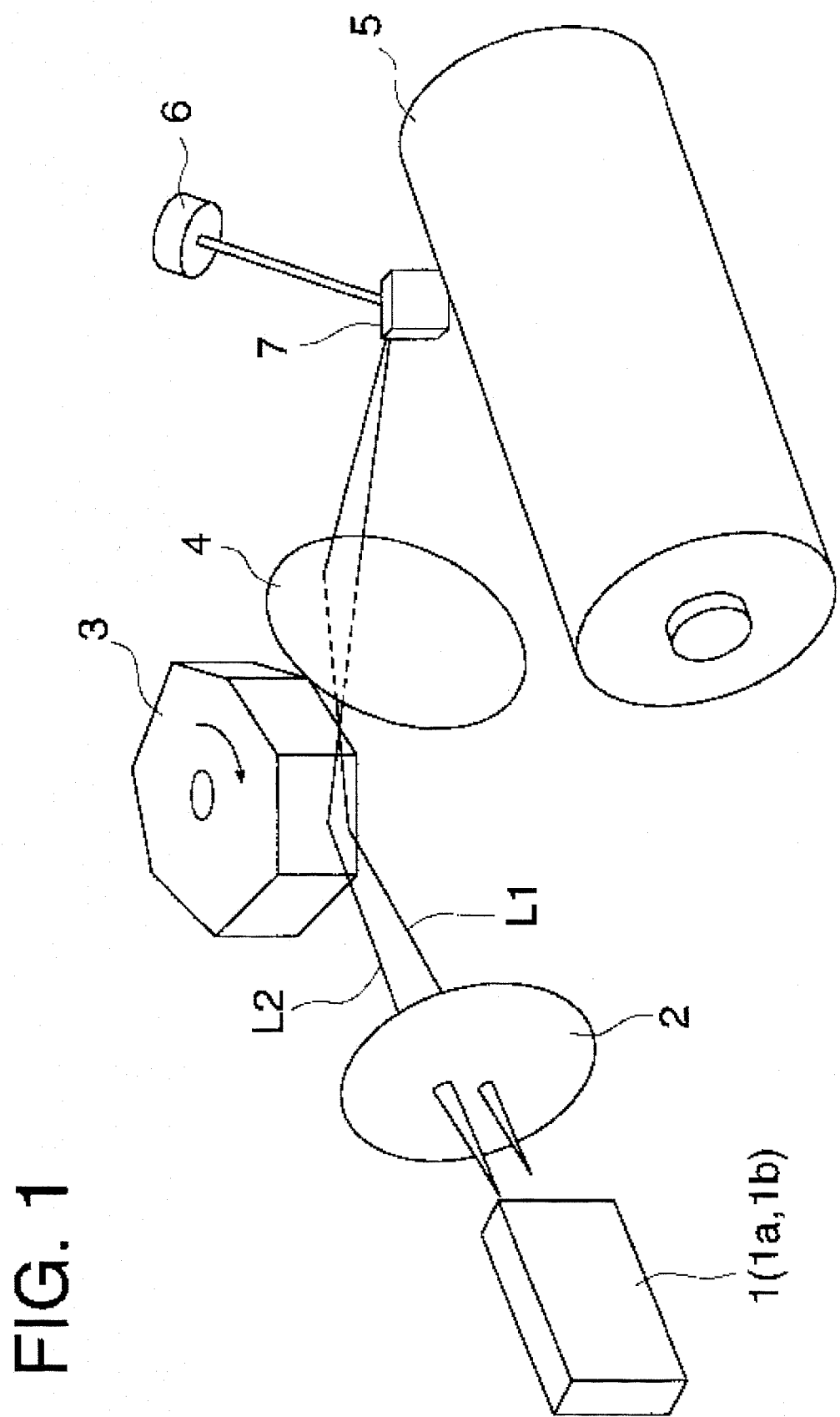
FIG. 1 is a perspective view showing an image exposure system in an example of the invention.

FIG. 1 is an illustration showing a laser printer imagewise exposure system as an example of an image forming apparatus related to the invention. A laser printer in the present example is of a type wherein two laser beams (light means) L1 and L2 modulated internally depending on image data are caused to scan in parallel in the primary scanning direction so that two lines may be recorded simultaneously.

In FIG. 1, light source unit 1 is composed of two semiconductor lasers 1a and 1b which are arranged in a line, and two divergent light emitted from the light source 1 are converted by the condenser lens 2 into two laser beams L1 and L2 which are in parallel with each other.

The aforementioned two laser beams L1 and L2 are projected on polygon mirror 3 by which the laser beams L1 and L2 are deflected and are caused to scan on photoreceptor drum (recording medium) 5 through fθ lens 4.

The photoreceptor drum 5 is driven to rotate in synchronization with primary scanning operation of the laser beams L1 and L2, and thereby the laser beams L1 and L2 move in the sub-scanning direction (perpendicular to the primary scanning direction) relatively to the photoreceptor drum 5, thus two-dimensional image recording is carried out.

In the manner mentioned above, exposures corresponding to image data are conducted simultaneously for two lines and electrostatic latent images are formed on the photoreceptor drum 5 (recording medium). Then, toners charged to the polarity opposite to that on the electrostatic latent image are stuck on the latent image for development. After that, a recording sheet is superposed on a toner image, and electric charges whose polarity is opposite to that of corona charging are given on the reverse side of the recording sheet by a corona charging unit so that the toner image is transferred onto the recording sheet.

Points for the laser beams L1 and L2 deflected by the polygon mirror 3 to start scanning are detected by index sensor 6 provided on the side of a tip of a scanning area.

Reflecting mirror 7 is one for leading the laser beams L1 and L2 to the index sensor 6 when the laser beams L1 and L2 are projected on the tip of a scanning line.

The index sensor 6 is composed of five sensors A through E (A–D: Light beam detecting means, E: Reference beam detecting sensor) which are combined solidly as a 1-chip sensor and each of which is capable of outputting detection signals independently. The sensors ° A through E are arranged side by side in the primary scanning direction, and the laser beams L1 and L2 are caused to scan through the sensors in the order of A→B→D→C (→E).

A light beam detecting area (light-receiving area) in each of the sensors A–D is formed to be a right-angled triangle having a height in the sub-scanning direction (vertical direction in FIG. 2) that covers two scanning lines of the laser beams L1 and L2, allowing a margin. Sensor A is arranged so that the longer side of the two forming an included angle of 90° of the right-angled triangle forming the detecting area is an edge at the starting side (left side in FIG. 2) in the primary scanning direction and the longer side is perpendicular to the primary scanning direction (the longer side is in parallel with the sub-scanning direction). Sensor B, on the other hand, is arranged so that the hypotenuse of the right-angled triangle of the detecting area is an edge at the starting side in the primary scanning direction and the hypotenuse cuts the primary scanning direction at an angle formed by the longer side and the hypotenuse mentioned above. Sensor D is arranged in the manner of reversing Sensor A top to bottom, provided that the sub-scanning direction is assumed to be vertical. Sensor C is arranged so that its detecting area and that of Sensor A are symmetrical about the axis of symmetry that is in parallel with a sub-scanning direction.

Figure 2:
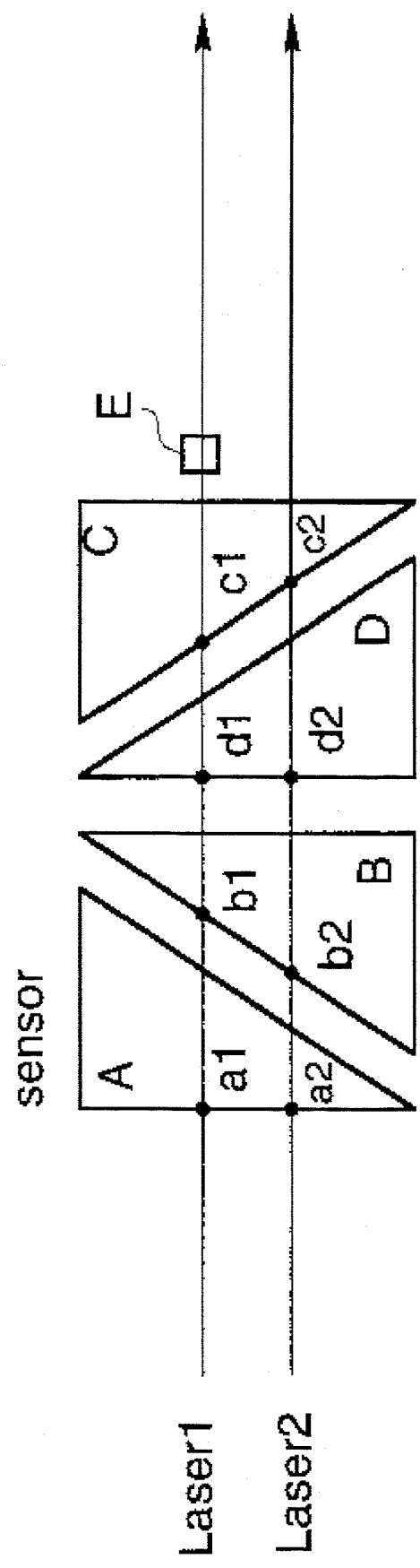
FIG. 2 is a diagram showing details of an index sensor.

Incidentally, with respect to Sensor A and Sensor C shown in FIG. 2, the longer side of the two forming an included angle of 90° may also be in parallel with the primary scanning direction, though it is arranged to be perpendicular to the primary scanning direction in FIG. 2.

With regard to an edge at the starting side in the primary scanning direction in the arrangement of the Sensors A through D mentioned above, the edges of Sensors A and D are in parallel with the sub-scanning direction, while the edge of Sensor B is not in parallel with that of Sensor C and both edges are opposite to each other in terms of inclination to the primary scanning direction. Namely, with regard to the distance between the edge at the starting side in the primary scanning direction on the detecting area of Sensor B to that of Sensor C, the more the scanning positions of laser beams L1 and L2 are deviated downward in FIG. 2, the more the distance becomes greater.

In FIG. 2, a1 represents a point on Sensor A to start detecting (the point where a beam detecting signal rises) for laser beam L1, a2 represents a point to start detecting for laser beam L2, and in the same manner, b1, b2, c1, c2, d1 and d2 represent points to start detecting for laser beams L1 and L2 for Sensors B–D.

The detecting interval of a laser beam in the case of Sensors A–D means an interval of timing when a laser beam is detected at the aforesaid point to start detecting, in other words, it shows a rising interval of a beam detecting signal for Sensors A–D.

The aforesaid Sensor E (reference light beam detecting means) is a sensor used for judging whether or not laser beam L1 which is a reference light beam out of two laser beams L1 and L2 passes through a target scanning position in the sub-scanning direction. That sensor is positioned within a range where the aforesaid target scanning position is at the center, and it outputs detecting signals only when laser beam L1 is within a tolerance of deviation of scanning position in the sub-scanning direction. In this case, the height in the sub-scanning direction in the light beam detecting area is set corresponding to the tolerance for deviation of scanning position, or a light-shielding member on which a slit having a width corresponding to the aforesaid tolerance is formed is put on the light-receiving plane of the Sensor E.

Figure 3:
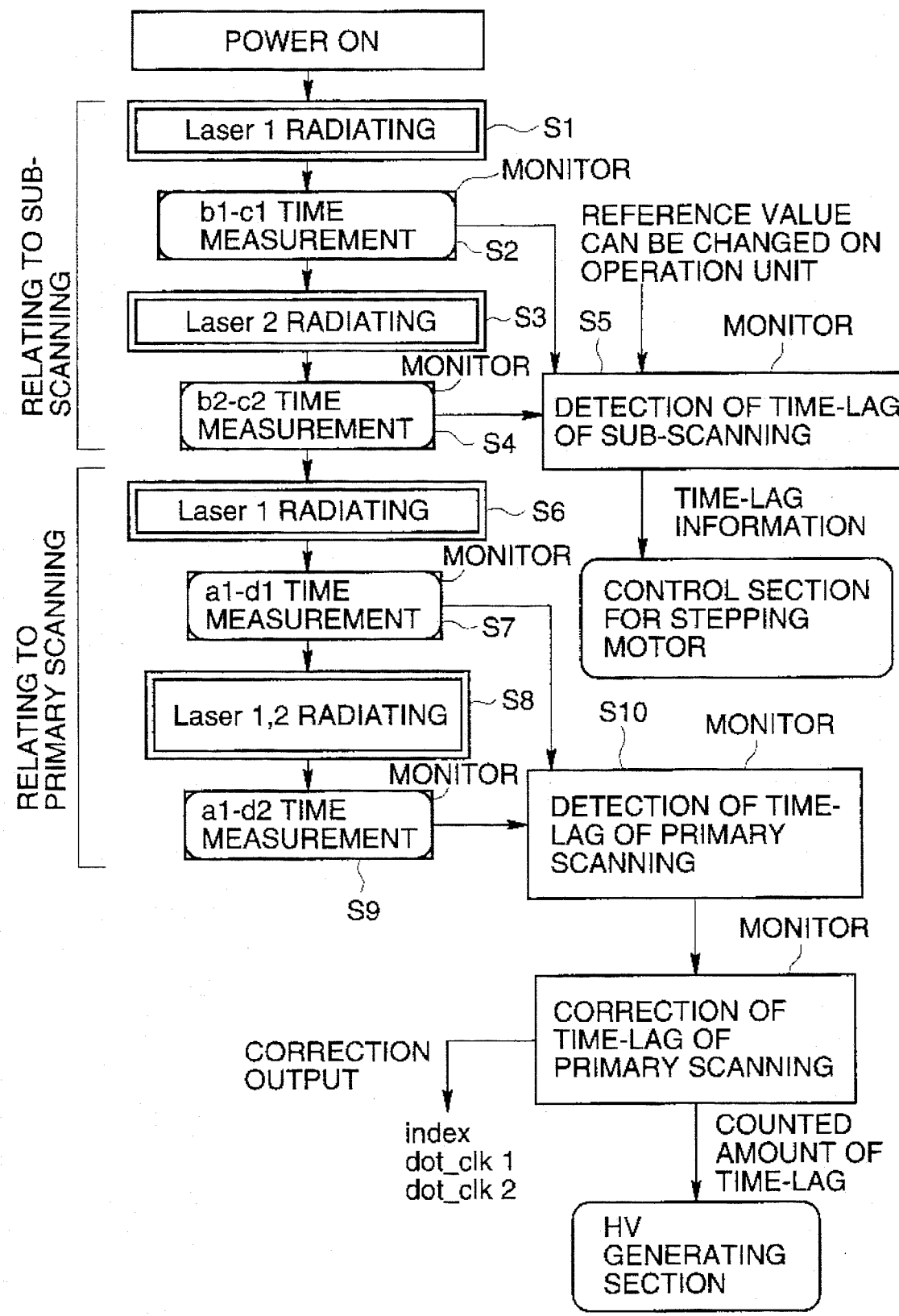
FIG. 3 is a flow chart showing detection of optical axis deviation in the primary scanning direction and sub-scanning direction.

In the present example, Sensors A–D having the aforesaid constitution are used for measuring an amount of deviation in the sub-scanning direction of the laser beams L1 and L2 in accordance with a flow chart shown in FIG. 3.

A program shown in the flow chart in FIG. 3 (means for calculating an amount of deviation in the sub-scanning direction) is executed every time the power is supplied to a laser printer, wherein laser beam L1 only is emitted first, and is caused to scan in the same manner as in ordinary image recording (S1).

Then, when laser beam L1 scans on the aforesaid Sensors A–D, time (detecting time difference) T1 (see FIG. 4) covering a range from the rise of beam detection of Sensor B (b1) to the rise of beam detection of Sensor C (c1) is measured (S2).

Next, laser beam L2 only is emitted replacing the laser beam L1 and is caused to scan in the same manner as in ordinary image recording (S3).

Next, in the same manner, when laser beam L2 scans on the aforesaid Sensors A–D, time T2 (see FIG. 4) covering a range from the rise of beam detection of Sensor B (b2) to the rise of beam detection of Sensor C (C2) is measured (S4).

After completion of measurement of the aforesaid time T1 and T2, absolute value T3 of difference of the time T1 and time T2 is calculated.

Further, deviation between the reference value of the aforesaid difference T3 corresponding to the normal distance in the sub-scanning direction between laser beam L1 and laser beam L2 and difference T3 obtained actually from the aforesaid processing is obtained as a value corresponding to the aforesaid amount of deviation in distance (S5).

Incidentally, it is preferable that the aforesaid reference value can be changed arbitrarily for establishment through an operation panel of the laser printer.

Figure 4:
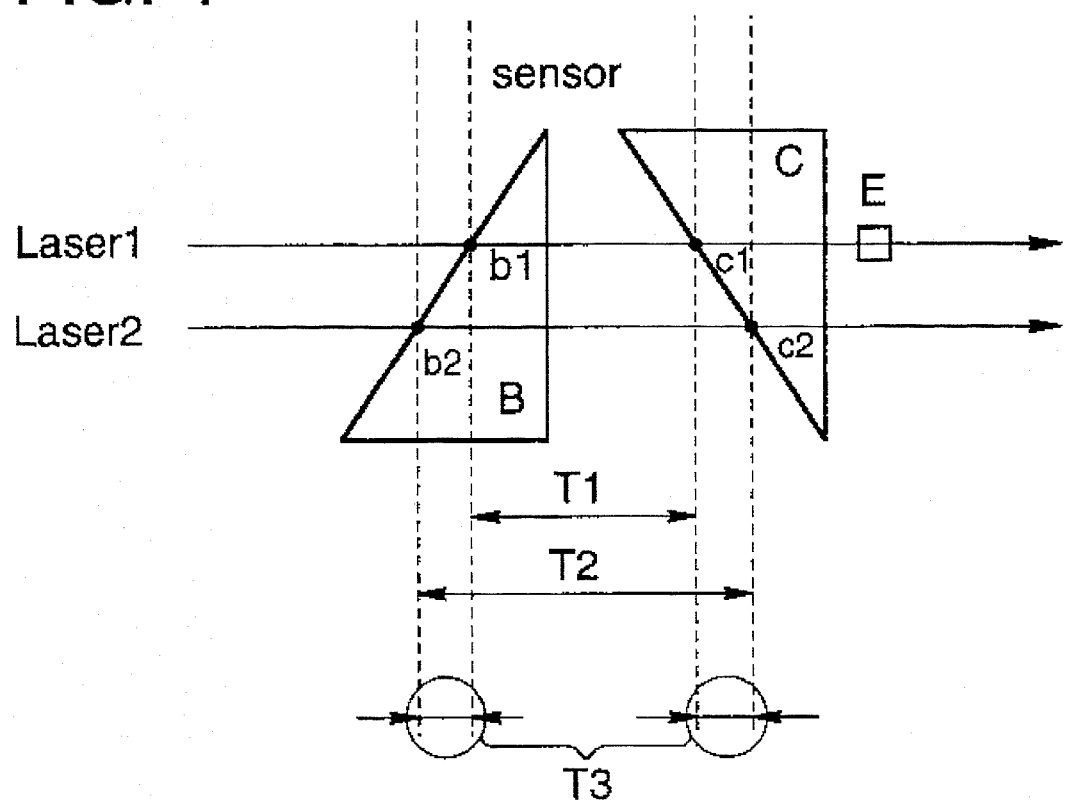
FIG. 4 is a diagram for illustrating how the deviation in the sub-scanning direction is detected.

Namely, let it be assumed, for example, that a scanning position of laser beam L2 is deviated in the sub-scanning direction downward in FIG. 4 when b1 and c1 which are positions in the sub-scanning direction of laser beam L1 detected by Sensors B and C are assumed to be reference positions, In this case, due to the arrangement that a distance between edges of start detecting on Sensors B and C expands toward both sides in the primary scanning direction as the scanning position goes down in FIG. 4, position b2 in the sub-scanning direction of laser beam L2 detected by Sensor B is deviated to the left side, while position c2 is deviated toward the right side both in FIG. 4. Thus, time T2 becomes longer and time T3 becomes long further against the reference.

Accordingly, it is possible to calculate an amount of deviation in the distance between laser beams L1 and L2 based on information of the scanning speed and angles of inclination of hypotenuses, after obtaining the deviation between time T3 and the reference value.

In this case, when a mechanism (a means for adjusting deviation in the sub-scanning direction) capable of adjusting the scanning direction in the sub-scanning direction as disclosed in Japanese Patent O.P.I. Publication No. 50809/1988 is provided on the laser beam L2 side with a fixed scanning position of laser beam L1 (reference light beam), for example, it is possible to correct the distance in the sub-scanning direction between laser beams L1 and L2 to the target value by adjusting the scanning position in the sub-scanning direction of laser beam L2 based on information of the calculated amount of deviation mentioned above with the fixed scanning position of laser beam L1.

In the apparatus disclosed in Japanese Patent O.P.I. Publication No. 50809/1988, a holding plate that holds prisms through which a laser beam passes is supported so that the holding plate can rotate around an axis that is in parallel with the prism surface, and an adjusting screw that touches the rotating tip of the holding plate and determines an angle of the holding plate is used for advanced or retracted for adjusting an angle of the prism. Thus, a pitch (distance) in the sub-scanning direction is adjusted.

Figure 5:
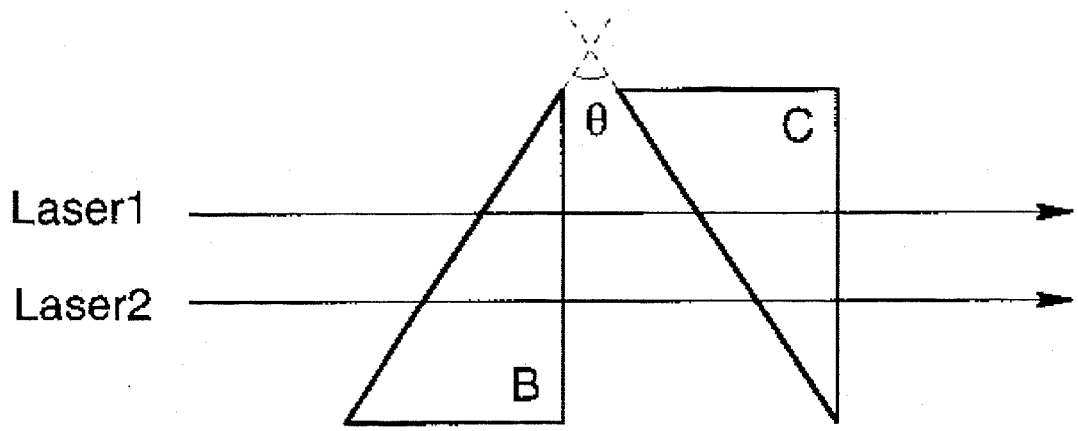
FIG. 5 is a diagram showing sensor angle θ.

When the deviation of distance in the sub-scanning direction between laser beam L1 and laser beam L2 is detected in the above manner, time difference caused by the deviation varies depending on angle (included angle) θ (see FIG. 5) formed by an edge on the detecting area at the starting side in the primary scanning direction for Sensor B and that for Sensor C. Larger angle θ can make the amount of time difference generated for a unit amount of deviation greater, but the larger angle θ, on the other hand, makes the sensor chip wherein Sensors A–D are integrated solidly greater, which is a problem.

Therefore, it is preferable that the aforesaid angle θ is set to be a necessary and smallest angle in accordance with the resolving power required by detection of a deviation amount. Establishment of an optimum value for the angle θ will be explained as follows.

Figure 6:
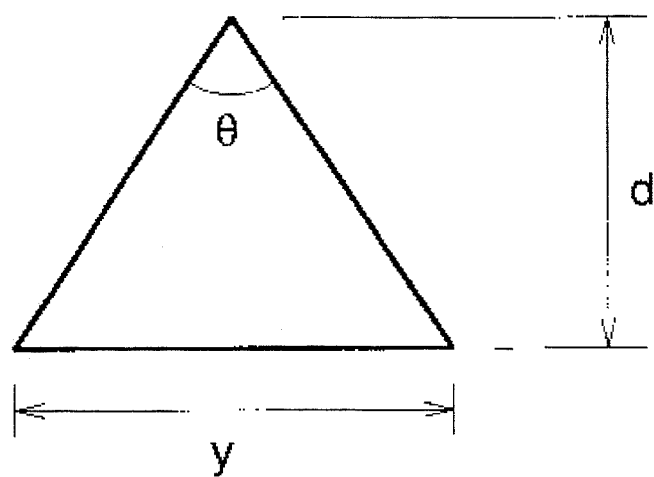
FIG. 6 is a diagram showing the correlation among sensor angle θ, one pixel width d and sensor distance y.

In this case, when assuming that v represents scanning speed of laser beams L1 and L2, d represents the width of a pixel, T represents a pixel clock cycle, and CB represents pixel clock resolving power, beam detection interval variation Δt between Sensor B and Sensor C in the case where scanning position is deviated in the sub-scanning direction by one pixel width is as follows, if y (see FIG. 6) represents the change of the distance between Sensor B and Sensor C (distance between the starting point of primary scanning on Sensor B to the starting point of primary scanning on Sensor C) caused by the deviation equivalent to the width of a pixel.

$$\Delta t = y/v$$

Further, y can be represented as follows.

$$y = d \cdot \tan(\theta/2) \cdot 2$$

Therefore, the following relation holds.

$$\Delta t = d \cdot \tan(\theta/2) \cdot 2/v$$

On the other hand, when assuming that the required resolving power for detection of one pixel width is K or greater than that, the following inequality holds.
ti $K \leq \Delta t/(T/CB) = \Delta t \cdot (CB/T)$
Since the relation of T=d/v holds in the above inequality, the following relation holds.

$$K \leq \frac{d \cdot \tan(\theta/2) \cdot 2}{v} \times \frac{CB \cdot v}{d} = 2 \cdot CB \cdot \tan(\theta/2)$$

From the above, the following holds in terms of angle θ.

$$\theta \geq 2 \cdot \tan^{-1}(K/2\ CB)$$

Namely, if a value of the angle θ satisfies the above inequality when assuming that pixel clock resolving power is CB and required resolving power for detection is K, the required resolving power for detection K can be secured. Further, it is generally preferable that the resolving power for detection K is one up through four times the pixel clock resolving power CB. In this case, the relation of 53.13°≦θ≦126.86° is satisfactory for angle θ because the relation of ½≦K/(2CB)≦2 holds. Namely, when θ is not larger than 53.13°, sufficient resolving power is not obtained, and there is a high possibility that beams overlap each other. When θ is not smaller than 126.86°, the sensor itself needs to be larger in size, resulting in its higher cost and longer time for the beam to pass through the sensor. In the present example, a plurality of delay clocks are generated by a reference clock (see FIG. 7) and clocks synchronized with detection signals from a sensor are made to be pixel clocks. In this case, the pixel clock resolving power CB mentioned above means the total number of the delay clocks corresponding to one pixel.

Incidentally, even when the angle θ which can secure the required resolving power in the aforesaid manner is determined, the correlation between an amount of deviation in the sub-scanning direction and an interval of detection time is shifted and an amount of deviation of sub-scanning interval is thereby detected erroneously. With regard to Sensors A-D (light beam detecting means), therefore, it is preferable that sensors are not provided separately and individually, but one chip sensor wherein Sensors A-D are integrated solidly is provided and an error of the angle θ is minimized to the utmost.

Since it is naturally desirable to detect an interval in the sub-scanning direction on photoreceptor drum 5 (recording medium) between laser beams L1 and L2, it is preferable that light-receiving surfaces of Sensors A-D are made to be equivalent to image-forming planes of the photoreceptor drum 5 (recording medium) so that the laser beams L1 and L2 may be detected under the same focal condition (focal length) as in the occasion where they are detected on the photoreceptor drum 5, and deterioration of detection accuracy caused by inclination and a position of a light-receiving surface of the sensor is prevented.

Further, results of measurement of the aforesaid time T1 and T2 as well as information of an amount of deviation calculated finally may also be indicated on the display provided on a laser printer.

Figure 7:
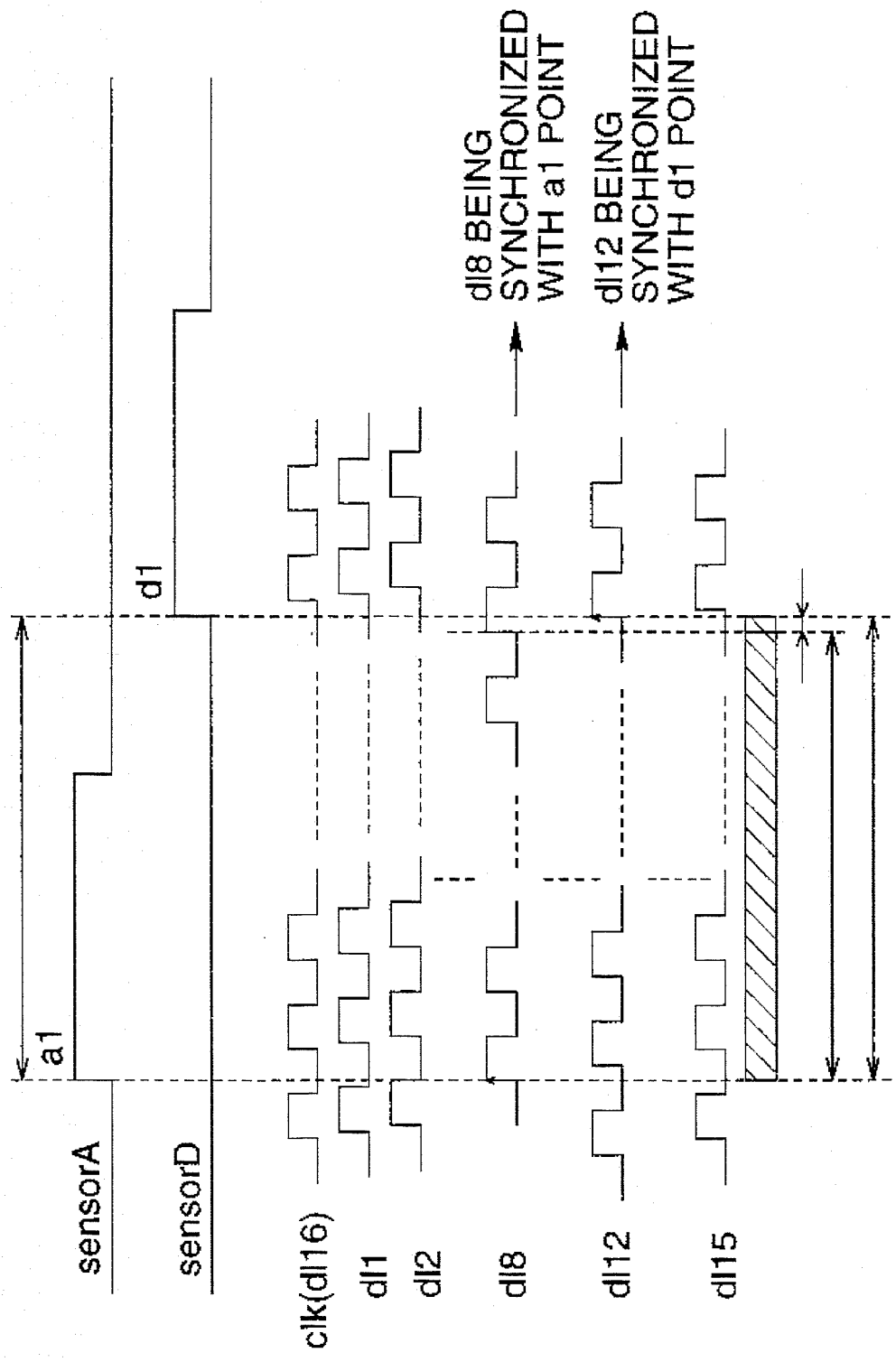
FIG. 7 is a time chart for illustrating how time is measured by using a clock.

Incidentally, the aforesaid Time T1 and T2 are measured in the manner shown in FIG. 7 in the present example.

Though FIG. 7 shows an occasion wherein difference between time detected by Sensor A for laser beam L1 and time detected by Sensor D for laser beam L1 (time length between a1 and d1) is measured, other combination among Sensors A-D will also do in the same manner.

In FIG. 7, 16 kinds of delay clocks d10 (reference clock) -d115 are generated by the use of digital delay lines by delaying reference clock clk by 1/16 cycle gradually. Incidentally, clocks clk, d11, d12, d18, d112 and d115 only are shown and other delay clocks are not shown in FIG. 7.

When assuming that clock d18 is a clock synchronized with rise a1 of a detection signal of Sensor A (clock that rises first immediately after a rise of the detection signal), for example, rises of the clock d18 are counted in succession with the rise in the synchronization representing the first count.

Assuming that a detection signal of Sensor D rises in the aforesaid counting and clock d112 is a clock synchronizing with rise (d1) of the detection signal, a value obtained by adding a phase difference between clock d18 and clock d112 (4/16 cycle and can be indicated as delay clock No.=d14) to a time period obtained by multiplying the value calculated by subtracting 1 from the number of the rises of the clock d18 counted until that moment of the rise of the detection signal of Sensor D (including the rise of clock d18 synchronized with detection signal of Sensor A (a1)) represents the output time difference of detection signals between the Sensors A and D (interval between a1 and d1).

In the detection of deviation in the sub-scanning direction, time T1 and time T2 can be obtained in the manner mentioned above as the clock count number and the delay clock number, while the reference time corresponding to the stipulated value of an interval can be given as the clock count number and the delay clock number. In the calculation of time difference, the count number and the delay clock number can independently be calculated.

Figure 8:
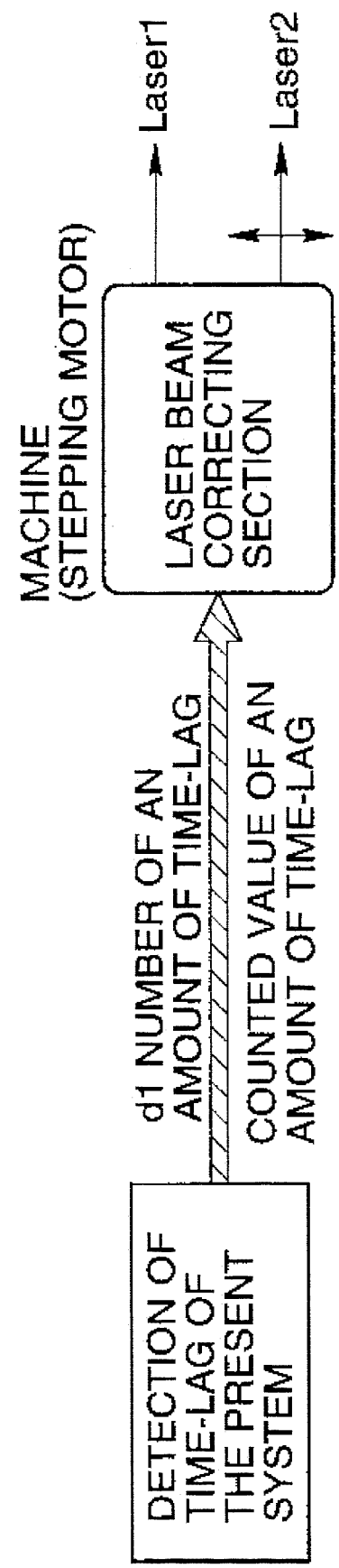
FIG. 8 is a block diagram showing how an optical axis is adjusted based on the results of detected deviation.

In this case, information of an amount of deviation in the sub-scanning direction is outputted as the clock count number and the delay clock number to an adjusting means for deviation in sub-scanning direction (for example, stepping motor) that adjusts the scanning position in the sub-scanning direction for laser beam L2 (See FIG. 8).

Next, an example of the actual circuit (deviation calculating means in the sub-scanning direction) wherein time is measured in the above manner and deviation is detected based on the results of the measurement will be explained as follows, referring to FIG. 9.

Figure 9:
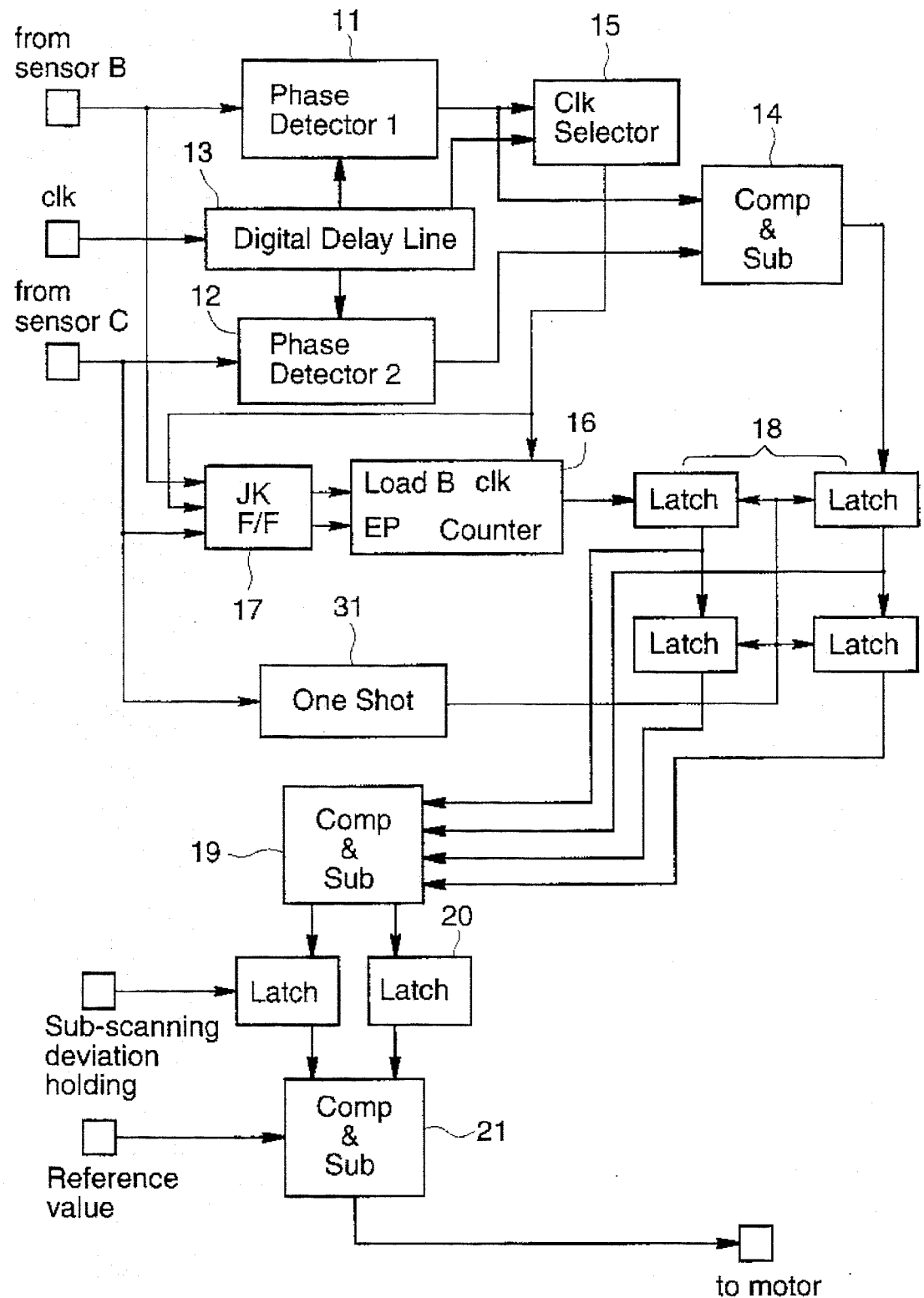
FIG. 9 is a block diagram showing a circuit layout that detects optical axis deviation in the sub-scanning direction.

In FIG. 9, output of Sensors B and C are outputted respectively to phase detector (1)11 and phase detector (2)12.

On the other hand, reference clock clk is inputted in digital delay line 13, and the digital delay line 13 outputs the aforesaid clocks d10-d115.

In the phase detectors (1)11 and (2)12 mentioned above, each of delay clocks d10-d115 synchronizing with rises of detection signals of Sensors B and C is detected (see FIG. 7), and the result of the detection is outputted to phase difference calculating unit 14.

In the phase difference calculating unit 14, the phase difference (unit of 1/16 cycle) between the clock synchronizing with detection timing (b1 or b2) of Sensor B and the clock synchronizing with detection timing (c1 or c2) of Sensor C, namely, the fraction within a clock cycle of detection interval between Sensors B and C is obtained, and the result thereof is latched in latch circuit 18 in accordance with one shot pulse generated from the detection signal of Sensor C.

The result of detection of the aforesaid phase detector (1)11 is outputted also to clock selector 15 from which the delay clock synchronizing with detection signal of Sensor B is outputted selectively to counter 16.

In the counter 16, an interval time between rises b1(b2) and c1(c2) of output of Sensors B and C is measured by counting clocks outputted from the aforesaid clock selector 15. Incidentally, a count section of the counter 16 is controlled by flip-flop 17 into which the output of Sensors B and C are inputted.

A value of the count made by the counter 16 is latched in the latch circuit 18 by one shot pulse generated from detection signal of Sensor C.

Thus, time T1 that is an interval of detection of Sensors B and C in the case where laser beam L1 only is emitted, for example, is measured and stored in the latch circuit 18, then, time T2 for the occasion where laser beam L2 only is emitted is measured and stored in the latch circuit 18.

After the time T1 and time T2 are obtained as a clock count number and a clock phase difference, deviation of the time T1 and time T2 is calculated separately by the count number and the clock phase difference in time difference calculating unit 19, and the result of the calculation is stored temporarily in latch circuit 20.

In deviation calculation unit 21, a reference value given through an operation section is compared with data stored in the latch circuit 20 so that the deviation (an amount of change in an interval) in the sub-scanning direction between Laser beams L1 and L2 may be calculated. Then, the results of the calculation are outputted to a display and also given to an adjusting means (means for adjusting deviation in the sub-scanning direction) that adjusts a scanning position in the sub-scanning direction of laser beam L2, so that correction of the deviation in the sub-scanning direction may be made with the scanning position of laser beam L1 as a reference.

As stated above, a deviated amount in an interval in the sub-scanning direction between laser beams L1 and L2 is calculated through measurement of an interval time conducted by detecting the laser beams with Sensors B and C, and based on the deviated amount mentioned above, the scanning position of laser beam L2 is adjusted for the scanning position of the fixed laser beam L1 (reference beam). Thus, an interval in the sub-scanning direction between laser beam L1 and laser beam L2 can be adjusted to the target value.

However, when the scanning position of laser beam L1 which is a reference for a scanning interval is deviated in the sub-scanning direction, occurrence of variation in an interval of scanning lines can not be avoided even when the beam interval is adjusted to the target value.

Figure 10:
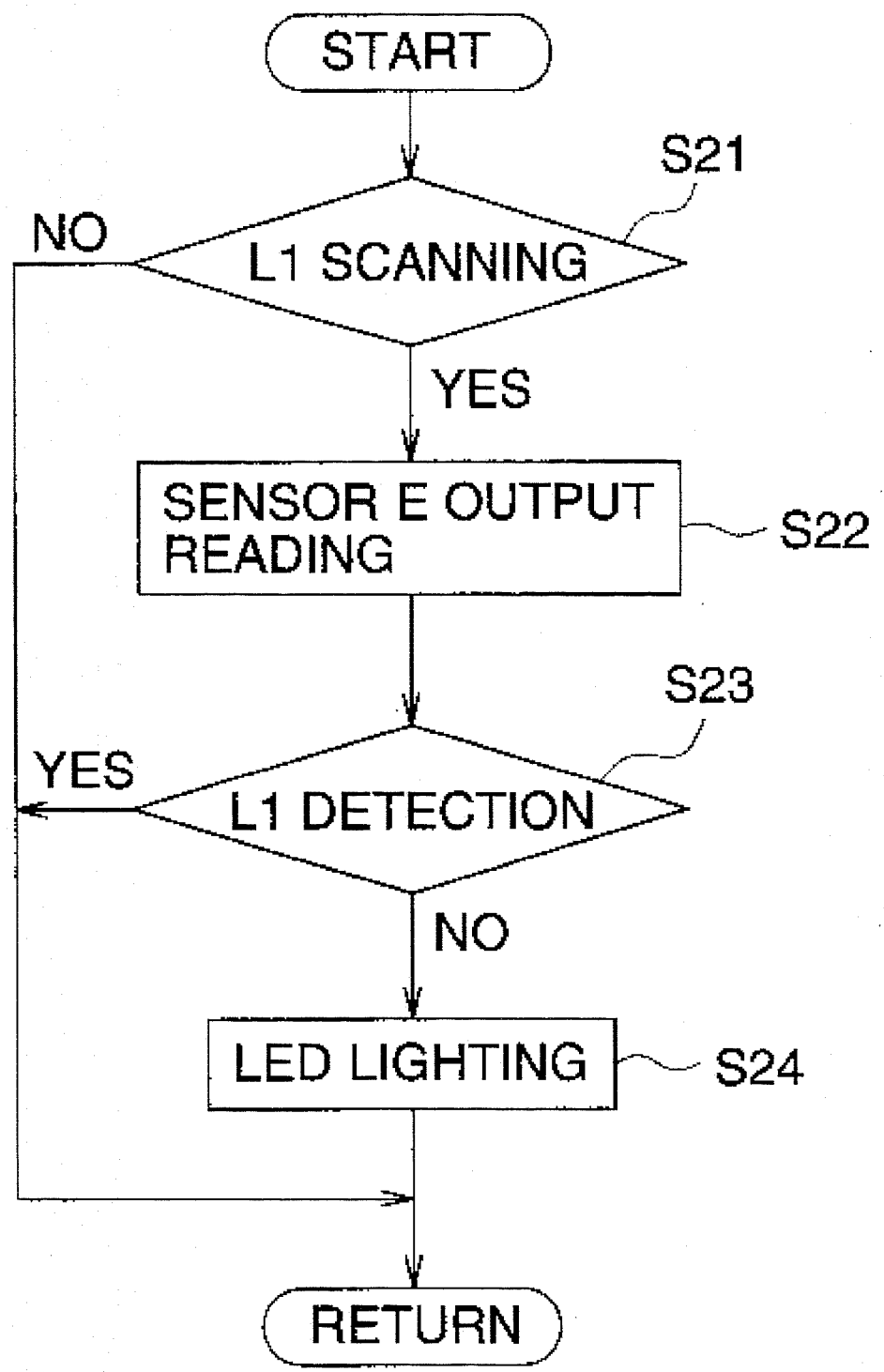
FIG. 10 is a flow chart showing how the scanning position deviation of laser beam L1 is detected by the use of sensor E.

In the present example, therefore, the aforesaid Sensor E (reference light beam detecting means) is used as shown in a flow chart in FIG. 10 to judge simply whether laser beam L1 (reference light beam) is scanning on the target scanning position in the sub-scanning direction or not.

In the flow chart (reference light beam deviation detecting means) in FIG. 10, whether the laser beam L1 is scanning or not is judged first (S21), and when it is scanning, an output of Sensor E is read (S22).

Then, when the laser beam L1 is not detected by the Sensor E (S23), LED (reference light beam deviation warning means) is lit to warn the deviation of scanning position of the laser beam L1 (S24).

Namely, the aforesaid Sensor E is arranged to detect laser beam L1 only when the laser beam L1 is scanning within an allowable range in the sub-scanning direction wherein the target scanning position is a center. Therefore, when the sensor E does not detect the laser beam L1 even when it is scanning, the laser beam L1 can be presumed to be deviated to the outside of the allowable range in the sub-scanning direction.

In this case, if an LED is arranged to be lit as stated above when the deviation in the sub-scanning direction of the laser beam L1 is detected, it is possible to judge visually whether the laser beam L1 is scanning on the appropriate scanning position or not. Further, for the initial adjustment of the beam, it is possible to position the laser beam L1 easily while watching the LED display.

In the aforesaid arrangement, when the deviation of scanning position of laser beam L1 is detected, that deviation is warned. However, it is also possible to take another arrangement wherein an adjusting device identical to the aforesaid device capable of adjusting the scanning position of laser beam L2 is provided also on the part of laser beam L1, and thereby the beam interval is detected and the scanning position of laser beam L2 is adjusted based on the result of the detection, after the scanning position of laser beam L1 is automatically adjusted to the position that can be detected by Sensor E.

Figure 11:
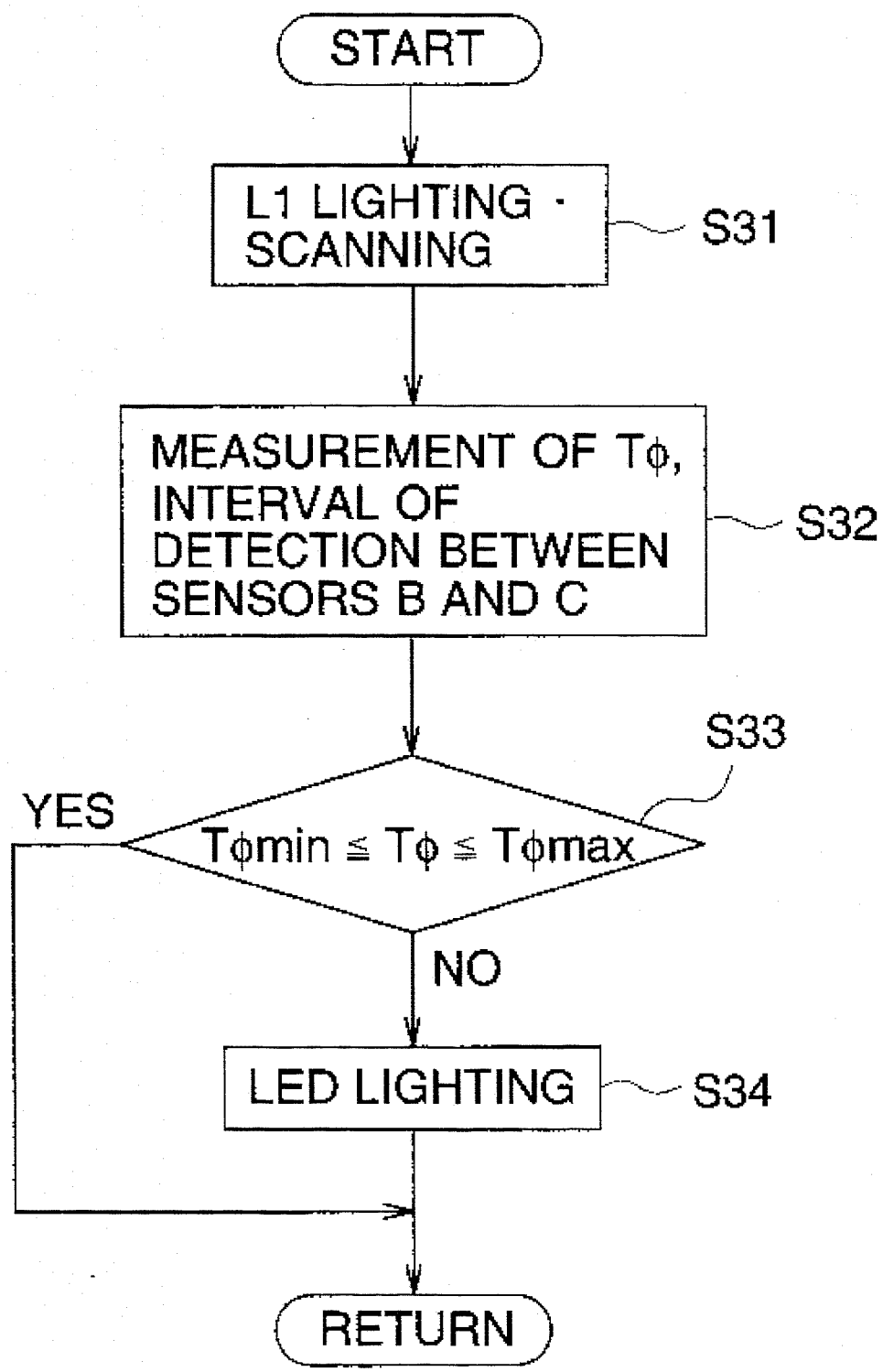
FIG. 11 is a flow chart showing how the scanning position deviation of laser beam L1 is detected by the use of sensors B and C.

In the example mentioned above, Sensor E provided separately makes it possible to detect the scanning position of laser beam L1. However, it is also possible to detect the scanning position in the sub/scanning direction of laser beam L1 by comparing the time interval obtained through detection of laser beam L1 (reference light beam) conducted by the aforesaid Sensor B and C with the target value as is shown in a flow chart (reference light beam deviation detecting means) in FIG. 11. In the case of the above arrangement, the aforesaid Sensor E is not needed, resulting in the simplified sensor arrangement.

Namely, when the laser beam L1 is caused to scan, an interval between detections of laser beam L1 by Sensor B and that by Sensor C is determined by both the scanning speed and the scanning position in the sub-scanning direction of the laser beam L1.

Therefore, laser beam L1 is subjected to emission/scanning (S31), and interval time T$\phi$ for rises of detection signals of Sensors B and C generated through detections of laser beam L1 conducted by Sensors B and C is measured (S32).

On the other hand, an detection interval in the case of scanning of laser beam L1 at the reference scanning position is obtained in advance, and based on such reference detection interval, an allowable range (T$\phi$ min≦T$\phi$≦T$\phi$ max) of the aforesaid interval time T$\phi$ is established.

Then, interval time T$\phi$ measured actually is judged whether it is within the aforesaid allowable range or not, and when the actual measurement is not within the allowable range, the laser beam L1 is judged to be deviated in the sub-scanning direction, and the deviation is warned by LED (reference light beam deviation warning means) that is lit (S34).

In the aforesaid manner, laser beam L1 can be adjusted easily in terms of its scanning position based on lighting of the aforesaid LED even in the case of arrangement wherein deviation of laser beam L1 is detected based on interval time T$\phi$. Further, it is also possible to adjust the scanning position of the laser beam L1 automatically based on the result of judgment.

Incidentally, in the automatic adjustment of scanning position of laser beam L1 wherein Sensor E is employed, when the position deviation is detected by the Sensor E, the scanning position of the laser beam L1 is moved gradually in a certain sub-scanning direction first, and when the beam is detected by the Sensor E within a predetermined moving distance, the scanning position of the beam is fixed at that position, or the scanning position is moved reversely by a predetermined distance and fixed at its position. On the other hand, when the beam is not detected by the Sensor E even when the scanning position is moved by the aforesaid predetermined moving distance, the moving position is moved reversely to find out the position where the beam is detected by the Sensor E. It is preferable to warn that adjustment is impossible when the beam L1 is not detected by the Sensor E even when the scanning position is moved upward or downward by the aforesaid predetermined moving distance.

In the case of an arrangement wherein the scanning position of laser beam L1 is judged by the aforesaid interval time T$\phi$, the direction of deviation can be judged depending on which direction the interval time T$\phi$ is deviated for the allowable range. Therefore, it is preferable that the scanning position is adjusted toward the result of judgment.

In the foregoing explanation, only Sensors B and C among Sensors A-D are used to detect an amount of deviation in the sub-scanning direction between laser beams L1 and L2 and to process for adjusting the deviation. However, it is preferable that the scanning position relation (deviation in the primary scanning direction) of laser beams L1 and L2 in the primary scanning direction is detected after the above-mentioned process of adjustment, and based on the result of the detection, the point of start writing is controlled for both the laser beams L1 and L2. Sensors A and D are provided for this reason.

Contents of the aforesaid process for detecting deviation in the primary scanning direction are indicated to follow the detection of deviation in the sub-scanning direction in a flow chart in FIG. 3.

Figure 12:
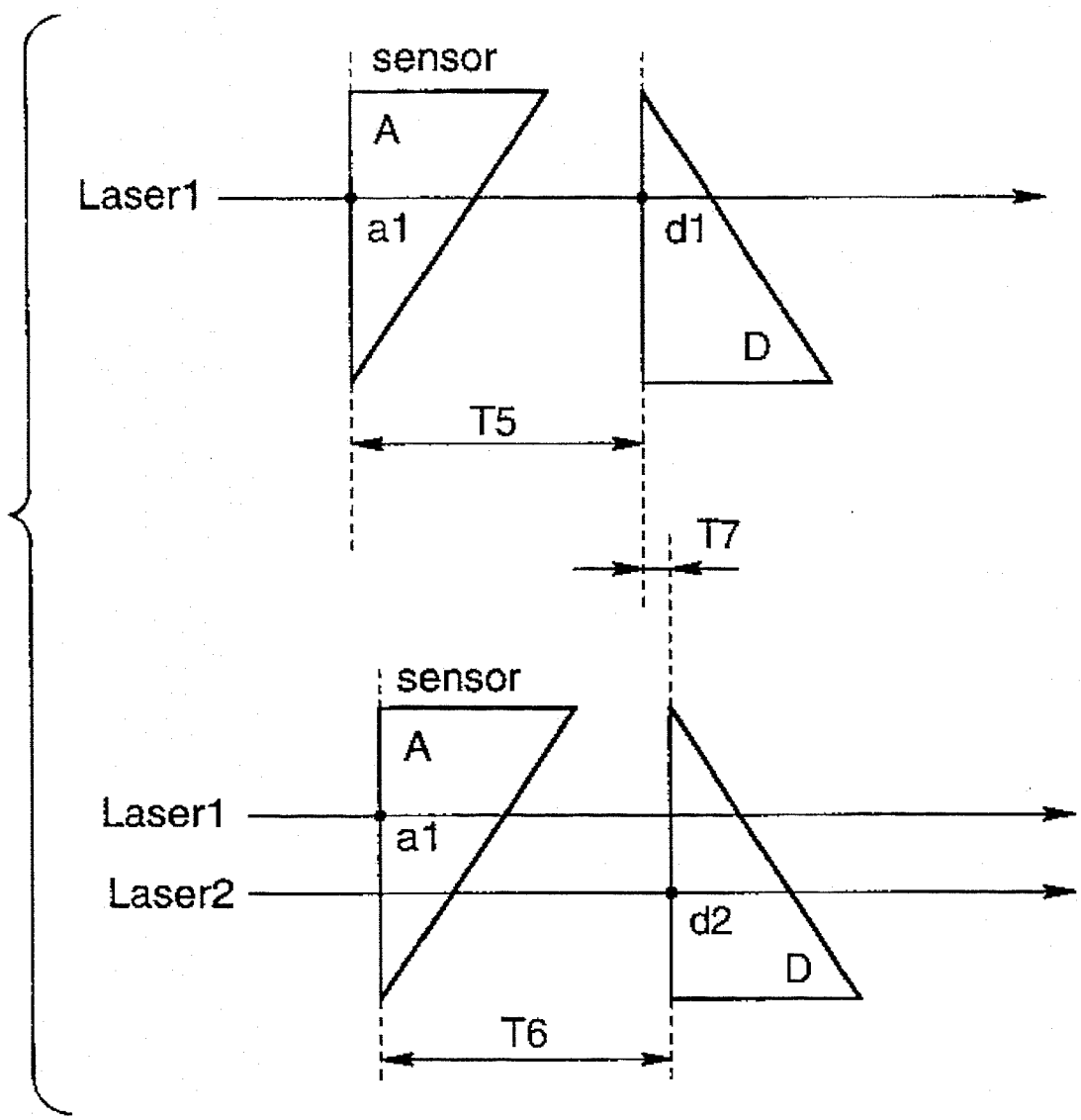
FIG. 12 ms a diagram for illustrating characteristics of detection of a deviation in the primary scanning direction.
Figure 13:
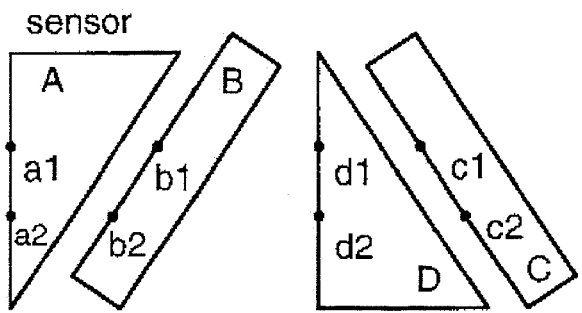
FIG. 13 is a diagram showing other example of sensor construction.
Figure 14:
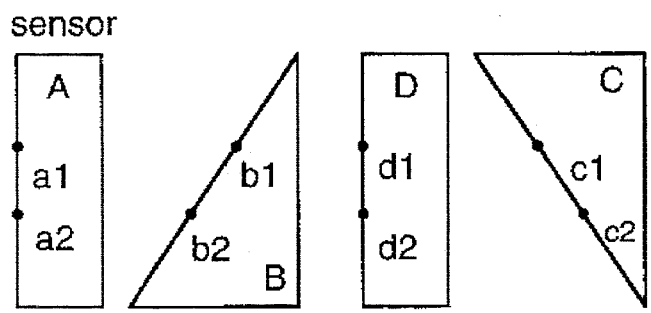
FIG. 14 is a diagram showing further example of sensor construction.
Figure 15:
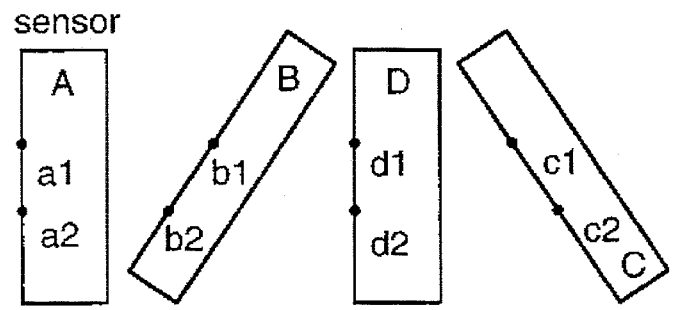
FIG. 15 is a diagram showing still further example of sensor construction.
Figure 16:
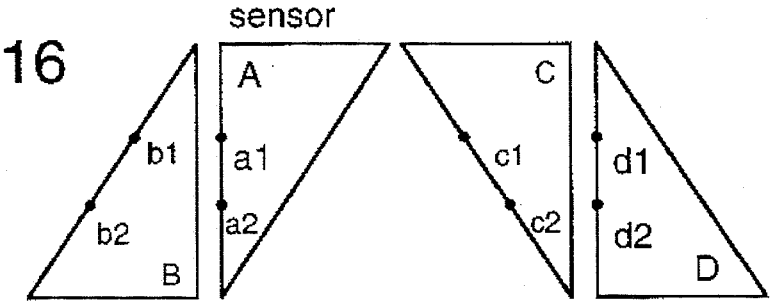
FIG. 16 is a diagram showing another example of sensor construction.

First, laser beam L1 only is emitted (S6), and time difference T5 (see FIG. 12) between the rise (a1) where laser beam L1 is detected by Sensor A and the rise (d1) where laser beam L1 is detected by Sensor D is caused to be measured (S7).

In this case, since the edge including the starting points for primary scanning in a light beam detecting area for Sensors A and D is in parallel to the sub-scanning direction (perpendicular to the primary scanning direction), the aforesaid time difference T5 is determined by only the distance between edges each including the starting point for primary scanning for each of Sensors A and D and the scanning speed, without being affected by the scanning position in the sub-scanning direction.

Next, laser beams L1 and L2 are caused to scan while their masks are being controlled so that laser beam L1 only enters Sensor A and laser beam L2 only enters Sensor D (S8), and time difference T6 (see FIG. 12) between the rise (a1) where the laser beam L1 is detected by the Sensor A and the rise (d2) where the laser beam L2 is detected by the Sensor D is caused to be measured (S9).

The aforesaid mask control may be conducted either through a method for turning the laser beams L1 and L2 on and off or through a method wherein a polarization element is used so that each of the laser beams L1 and L2 enters Sensor A or Sensor D selectively.

In this case, when each of laser beams L1 and L2 is caused to scan without being deviated in the primary scanning direction, the aforesaid time differences T5 and T6 should be the same. For example, when laser beam L2 is caused to scan with a delay from the scanning of laser beam L1, the delay can be obtained as "T6-T5(=T7)" (S10: See FIG. 12).

Therefore, when the laser beam L2 is caused to start Writing with a delay of the aforesaid time T7 after the start of writing of laser beam L1 in the above occasion, image recording can be conducted by the two laser beams L1 and L2 started with a time lag between them and having no deviation in the primary scanning direction.

For the aforesaid control of the position of start writing, generation of horizontal synchronizing signal corresponding to laser beam L2 can be delayed by the aforesaid time T7 from generation of horizontal synchronizing signal corresponding to laser beam L1.

When the aforesaid time T5 and time T6 are obtained as the count number of delay clocks and clock phase difference as explained in the aforesaid detection of deviation in the sub-scanning direction, it is adoptable that horizontal synchronizing signals are adjusted based on the count number of delay clocks, and a deviation obtained as a clock phase difference is adjusted through selection of dot clocks which are caused to correspond to laser beams L1 and L2 from delay clocks d10–d115.

Incidentally, shapes and combination of detecting areas of Sensors A–D used for detection of deviations in the sub-scanning and primary scanning directions mentioned above are not limited to those shown in FIG. 2, and arrangements of Sensors A–D shown in FIGS. 13–16, for example, are also allowed.

Namely, for detecting a deviation in the sub-scanning direction, an arrangement wherein an edge at the starting side of primary scanning in each light beam detecting area is not in parallel to others has only to exist, and for detecting a deviation in the primary scanning direction, an arrangement wherein an edge at the starting side of primary scanning in each light beam detecting area is perpendicular to the primary scanning direction and is in parallel to others has only to exist. Further, a shape of the detecting area may be either a triangle or a square provided that an edge at the starting side of primary scanning in each light beam detecting area is stipulated.

Figure 17:
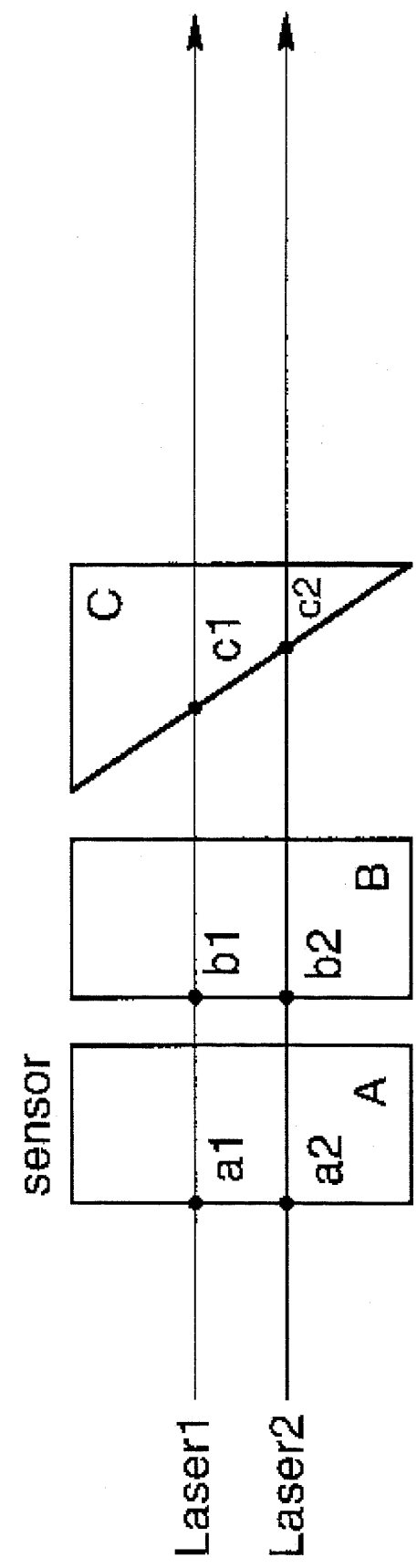
FIG. 17 is a diagram showing a 3-sensor construction.

Though four Sensors A–D composed of a pair of sensors used for detection of deviation in the sub-scanning direction and a pair of sensors used for detection of deviation in the primary scanning direction are used in the foregoing arrangement, three Sensors A–C can also carry out the same function as shown in FIG. 17.

Namely, in the arrangement shown in FIG. 17, two Sensors A and B each formed to be a square light beam detecting area are provided so that their edges at the starting side of primary scanning in light beam detecting areas may be perpendicular to the primary scanning direction, and Sensor C that is formed to be a triangular light beam detecting area is provided so that its leg serving as a starting side of primary scanning may be diagonal against the primary scanning direction.

Figure 18:
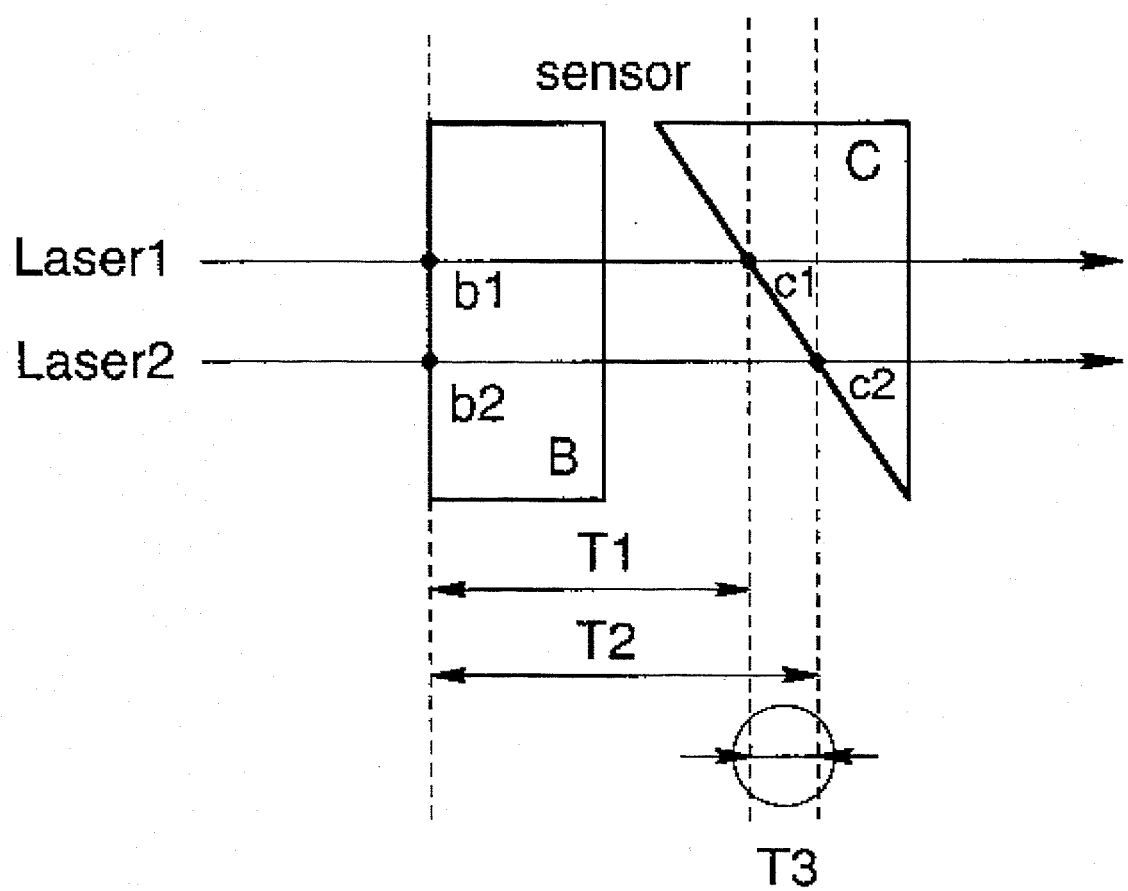
FIG. 18 is a diagram showing how the deviation in the sub-scanning direction is detected by three sensors.

When a deviation in the sub-scanning direction is to be detected in the aforesaid arrangement shown in FIG. 17, a combination of Sensor B and Sensor C, for example, is used (see FIG. 18). In this case, though an edge at the starting side of primary scanning in a light beam detecting area for Sensor B is perpendicular to the primary scanning direction, an edge at the starting side of primary scanning in a light beam detecting area for Sensor C is diagonal against the primary scanning direction. Therefore, when a deviation in the sub-scanning direction is caused, it appears as a change in time difference detected by Sensors B and C, thus, the deviation in the sub-scanning direction can be detected (see FIG. 18).

Figure 19:
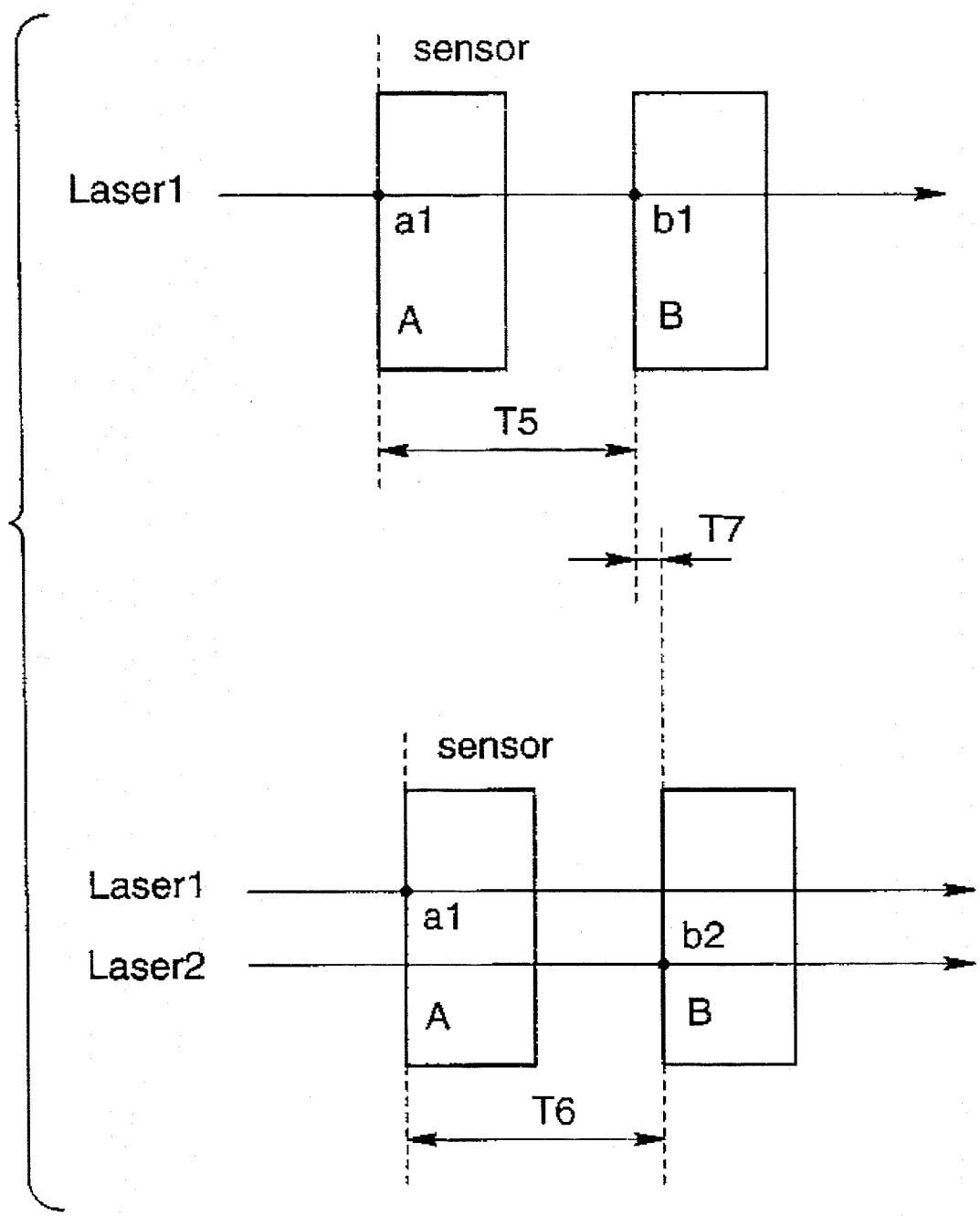
FIG. 19 is a diagram showing how the deviation in the primary scanning direction is detected by three sensors.
Figure 20:
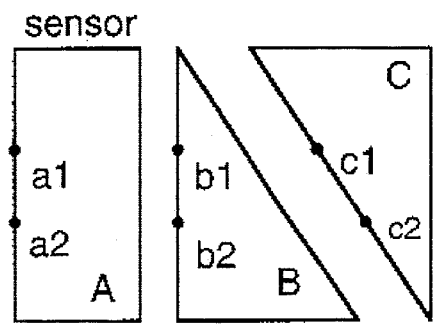
FIG. 20 is a diagram showing other example of sensor construction.
Figure 21:
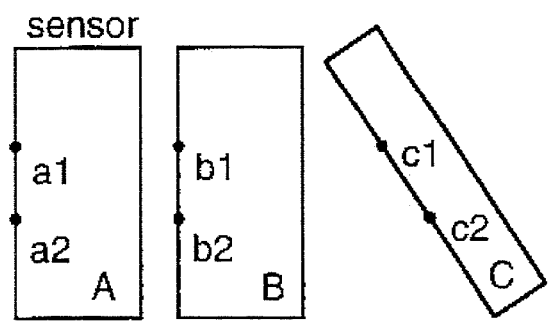
FIG. 21 is a diagram showing further example of sensor construction.
Figure 22:
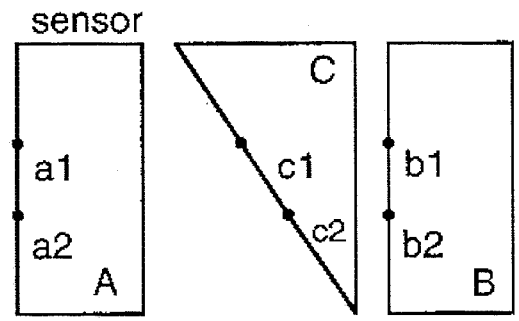
FIG. 22 is a diagram showing still further example of sensor construction.
Figure 23:
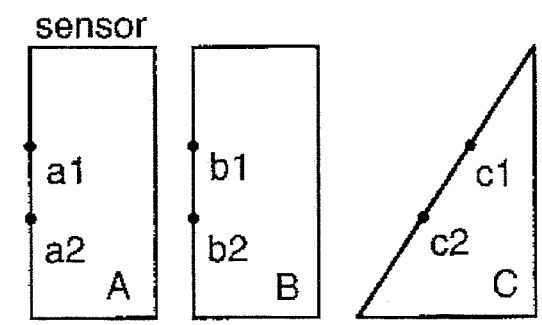
FIG. 23 is a diagram showing another example of sensor construction.

When detecting a deviation in the primary scanning direction with Sensors A–C shown in FIG. 17, it is possible to detect in the same manner as in the foregoing using a combination of Sensors A and B, as shown in FIG. 19.

Namely, even in the case of an arrangement composed of three Sensors A–C as shown in FIG. 17, a deviation in the sub-scanning direction and that in the primary scanning direction can be detected provided that an edge at the starting side of primary scanning in a light beam detecting area has two combinations including one wherein the edges are not in parallel with each other and one wherein the edges are in parallel to the sub-scanning direction, in other words, that there exist a pair of sensors which are in parallel to the sub-scanning direction and a sensor that is diagonal against the primary scanning direction.

Therefore, even in the case of a combination of three Sensors A–C, an arrangement thereof is not limited to that in FIG. 17, but various embodiments such as those shown in FIGS. 20–23, for example, are easily assumed.

Incidentally, when it is not necessary to detect a deviation in the primary scanning direction, it has only to provide a pair of sensors only wherein edges at the starting side of primary scanning in light beam detecting areas are not in parallel each other.

Even in the case wherein three laser beams L1, L2 and L3 are used for recording three lines simultaneously, it is possible to detect an amount of deviation in the sub-scanning direction for each of laser beams L2 and L3 based on a scanning position of laser beam L1 that is a reference, by detecting with a pair of sensors an amount of deviation in the sub-scanning direction regarding, for example, two laser beams L1 and L2 in the same manner as in the foregoing, and by detecting an amount of deviation regarding two laser beams L1 and L3. Therefore, an arrangement is not limited to those using two laser beams L1 and L2.

As stated above, a device of the invention of Claim 1 has an effect that an amount of deviation in the sub-scanning direction in a plurality of light beams can be detected easily, the scanning position in the sub-scanning direction of a reference light beam among the aforesaid plural light beams can be sensed, and thereby, fidelity of image forming can be improved by the plural light beams which are caused to scan on the target scanning positions.

Further, in a device of the invention, the scanning position in the sub-scanning direction of the aforesaid reference light beam is detected through checking whether the reference light beam passes through the reference scanning position or not. Therefore, whether scanning is conducted at the target scanning position or not can be detected easily on an ON-OFF basis.

Furthermore, in a device of the invention, the scanning position in the sub-scanning direction of the reference light beam is detected based on an interval of the reference light beam detected by a light beam detecting means. Therefore, a sensor for exclusive use is not needed and a simple arrangement makes it possible to detect the scanning position.

In a device of the invention, on the other hand, the scanning position of a reference light beam which is fixed is used for adjusting the scanning positions of other light beams based on the aforesaid detected amount of deviation. Therefore, it is possible to maintain intervals in the sub-scanning direction of light beams constant.

In a device of the invention, warning of a deviation of the scanning position of the aforesaid reference light beam makes it possible for an operator to judge easily a deviation of the scanning position in the sub-scanning direction of the reference light beam.

On the other hand, a device of the invention has an effect that the required resolving power which is necessary and lowest can be obtained surely when detecting a deviation in the sub-scanning direction of a light beam.

In a device of the invention, it is possible to establish the aforesaid required resolving power by stipulating the resolving power of a pixel clock as a reference.

Further, in a device of the invention, it is possible to detect precisely the deviation of scanning position in the sub-scanning direction of a light beam on a recording medium by means of a light beam detecting means when a light-receiving plane of the light beam detecting means is caused to be equivalent to an image-forming plane of the recording medium.

A device of the invention has an effect that detecting accuracy required for a light beam detecting means can be secured easily when light beam detecting means are structured solidly.

What is claimed is:

1. A light beam deviation detecting apparatus for detecting deviation of a plurality of parallel light beams which simultaneously scan a recording medium in a primary scanning direction of said plurality of parallel light beams, comprising:

a first sensor, having a first plane surface, for detecting said plurality of parallel light beams;

a second sensor, having a second plane surface, for detecting said plurality of parallel light beams after detection of said plurality of parallel light beams by said first sensor;

wherein an initial contact edge, of said first plane surface, with said plurality of parallel light beams, is not parallel to an initial contact edge, of said second plane surface, with said plurality of parallel light beams when said plurality of parallel light beams scan said first plane surface and said second plane surface in said primary scanning direction;

a calculator for counting time periods of said plurality of parallel light beams scanning from said initial contact edge of said first plane surface to said initial contact edge of said second plane surface, and for calculating difference among said time periods; and a deviation calculator for calculating deviation of said difference among said time periods from a reference time difference so that deviation of scanning positions of said plurality of parallel light beams in relation to each other in a sub-scanning direction, which is perpendicular to said primary scanning direction, determined;

wherein an angle θ between said initial contact edge of said first plane surface and said initial contact edge of said second plane surface satisfies:

$53.13° \leq \theta \leq 126.86°$.

2. The apparatus of claim 1, further comprising:

a deviation adjuster for adjusting scanning positions of said plurality of parallel light beams in said sub-scanning direction according to said deviation of scanning positions of said plurality of parallel light beams determined by said deviation calculator.

3. The apparatus of claim 1, wherein said first sensor and said second sensor are configured as one unit in said light beam deviation detecting apparatus.

4. The apparatus of claim 1, wherein said first sensor and said second sensor are accommodated in said light beam deviation detecting apparatus so that said first plane surface and said second plane surface have a same focal condition of said plurality of parallel light beams as that said recording medium has.

5. A light beam deviation detecting apparatus for detecting deviation of a plurality of parallel light beams which simultaneously scan a recording medium in a primary scanning direction of said plurality of parallel light beams, comprising:

a first sensor, having a first plane surface, for detecting said plurality of parallel light beams;

a second sensor, having a second plane surface, for detecting said plurality of parallel light beams after detection of said plurality of parallel light beams by said first sensor;

wherein an initial contact edge, of said first plane surface, with said plurality of parallel light beams, is not parallel to an initial contact edge, of said second plane surface, with said plurality of parallel light beams when said plurality of parallel light beams scan said first plane surface and said second plane surface in said primary scanning direction;

a calculator for counting time periods of said plurality of parallel light beams scanning from said initial contact edge of said first plane surface to said initial contact edge of said second plane surface, and for calculating difference among said time periods; and a deviation calculator for calculating deviation of said difference among said time periods from a reference time difference so that deviation of scanning positions of said plurality of parallel light beams in relation to each other in a sub-scanning direction, which is perpendicular to said primary scanning direction, is determined;

wherein an angle θ between said initial contact edge of said first plane surface and said initial contact edge of said second plane surface satisfies:

$$\theta \geq 2 \cdot \tan^{-1}\{K/(2CB)\}$$

wherein CB represents a pixel clock resolving power of said first sensor and said second sensor, and K represents a required resolving power of said first sensor and said second sensor for detection of one pixel width.

6. The apparatus of claim 5, wherein said required resolving power K is greater between 1 and 4 times than said pixel clock resolving power CB.

7. The apparatus of claim 5, further comprising:

a deviation adjuster for adjusting scanning positions of said plurality of parallel light beams in said sub-scanning direction according to said deviation of scanning positions of said plurality of parallel light beams determined by said deviation calculator.

8. A light beam deviation detecting apparatus for detecting deviation of a plurality of parallel light beams which simultaneously scan a recording medium in a primary scanning direction of said plurality of parallel light beams, comprising:

a first sensor, having a first plane surface, for detecting said plurality of parallel light beams;

a second sensor, having a second plane surface, for detecting said plurality of parallel light beams after detection of said plurality of parallel light beams by said first sensor;

wherein an initial contact edge, of said first plane surface, with said plurality of parallel light beams, is not parallel to an initial contact edge, of said second plane surface, with said plurality of parallel light beams when said plurality of parallel light beams scan said first plane surface and said second plane surface in said primary scanning direction;

a calculator for counting time periods of said plurality of parallel light beams scanning from said initial contact edge of said first plane surface to said initial contact edge of said second plane surface, and for calculating difference among said time periods;

a deviation calculator for calculating deviation of said difference among said time periods from a reference time difference so that deviation of scanning positions of said plurality of parallel light beams in relation to each other in a sub-scanning direction, which is perpendicular to said primary scanning direction, is determined; and a reference position deviation detector for detecting a deviation of a scanning position of a reference light beam, which is selected from said plurality of parallel light beams, in said sub-scanning direction from a reference scanning position.

9. The apparatus of claim 8, wherein said reference position deviation detector includes:

a reference light beam detection sensor, located on a scanning path of said reference light beam, for detecting said reference light beam, and for generating detection signals when said reference light beam scans through said reference light beam detection sensor;

wherein said reference position deviation detector detects said deviation of said scanning position of said reference light beam according to said detection signals.

10. The apparatus of claim 8, wherein said reference position deviation detector includes:

a second calculator for counting an interval time of said reference light beam scanning from said initial contact edge of said first plane surface to said initial contact edge of said second plane surface, and for determining whether said interval time of said reference light beam is within a predetermined interval time.

11. The apparatus of claim 8, further comprising:

a deviation adjuster for adjusting scanning positions of said plurality of parallel light beams in said sub-scanning direction according to said deviation of scanning positions of said plurality of parallel light beams determined by said deviation calculator.

12. The apparatus of claim 8, further comprising:

an indicator for indicating said deviation of said scanning position of said reference light beam when said scanning position of said reference light beam is out of said scanning position.

* * * * *